United States Patent [19]

Price

[11] Patent Number: 5,262,934
[45] Date of Patent: Nov. 16, 1993

[54] BIPOLAR VOLTAGE DOUBLER CIRCUIT

[75] Inventor: Colin C. Price, Newbury, England

[73] Assignee: Analogic Corporation, Norwood, Mass.

[21] Appl. No.: 901,914

[22] Filed: Jun. 23, 1992

[51] Int. Cl.⁵ .............................................. H02M 3/07
[52] U.S. Cl. ........................................... 363/60; 363/63
[58] Field of Search .................... 363/60, 63; 307/110, 307/296.2

[56] References Cited

U.S. PATENT DOCUMENTS

| | | | |
|---|---|---|---|
| 4,802,739 | 2/1989 | Iwamoto | 363/60 |
| 4,812,961 | 3/1989 | Essaff et al. | 363/63 |
| 4,999,761 | 3/1991 | Bingham et al. | 363/63 |
| 5,051,882 | 9/1991 | Grimm et al. | 363/60 |

FOREIGN PATENT DOCUMENTS 292148 11/1988 European Pat. Off. .
67769 3/1992 Japan .

OTHER PUBLICATIONS

Miller, "New Converter Sidesteps Second Power Supply," Canadian Elect. Eng. vol. 24, No. 5, pp. 48, 49, May 1980.

Primary Examiner—William H. Beha, Jr.
Attorney, Agent, or Firm—Iandiorio & Dingman

[57] ABSTRACT

A charge pump circuit for providing a bipolar output that substantially doubles the unipolar voltage input by utilizing a three-phase clock signal to charge a first capacitor in response to the first phase of the three-phase clock signal, then in response to either the second or third phase of the clock signal connect the first capacitor in series between the positive voltage input terminal and positive voltage output terminal to generate an output voltage which is positive in polarity and substantially double the voltage of the input source, then in response to the other of the second and third clock phases connect, between the input terminals, the first and second capacitors in series for providing a second polarity voltage across the second capacitor which is substantially double the source voltage and during either the following first or second clock pulse connect the second capacitor with its positive electrode connected to the negative input terminal and its negative electrode connected to the negative output terminal, thereby providing an output voltage which is negative in polarity and substantially double the voltage of the input source.

13 Claims, 2 Drawing Sheets

Three Phase Clock Signal

Three Phase Clock Signal

BIPOLAR VOLTAGE DOUBLER CIRCUIT

FIELD OF INVENTION

This invention relates to an improved charge pump circuit for producing a bipolar voltage output at substantially double the unipolar voltage input source, and more particularly to such an improved charge pump circuit which can provide the bipolar voltages in either order of polarity.

RELATED CASE

This case is related to and incorporates by reference "Bipolar Voltage Doubler Circuit" Ser. No. 07/844,509, filed Mar. 2, 1992.

BACKGROUND OF INVENTION

Voltage doubling and voltage inverting circuits are widely known and are widely used in electronic systems where power consumption is relatively low and a variety of different voltage levels are required for operation. Typically a single unipolar voltage supply of, for example, five volts can be used for generating a range of different bipolar voltages between five and fifteen volts. This is most desirable when these voltage doubling/inverting circuits, also known as charge pumping circuits, can be locally sited on the specific boards and near the specific IC's which rely on them. Presently available charge pumping circuits suffer from a number of shortcomings. In one approach three capacitors are used with a two-phase clock. All three capacitors are charged to the input source in one phase. In the other phase one capacitor is switched in series with the source to provide a positive voltage of twice the input source, and the other two capacitors are connected in series with the positive electrode of one connected to the negative input terminal and the negative terminal of the other capacitor connected to the negative output terminal to provide a substantially doubled, inverted output voltage. This arrangement requires three transfer capacitors which add to the cost and size of the IC chip. There is no time shared use of any of the transfer capacitors. One is used to generate the positive and the other two are used to generate the negative doubled output voltage. Another problem that commonly occurs is inequality of the positive and negative generated voltages. Generally, the negative voltage is generated using more switching devices than used to generate the positive voltage. This adds resistance and consequently reduces the generated negative voltage relative to the positive voltage. Separately, when a single charging of a transfer capacitor is used to generate both the positive and negative voltages, the second generated voltage tends to be lower because there is less charge available due to losses incurred during the generation of the first voltage.

SUMMARY OF INVENTION

It is therefore an object of this invention to provide an improved charge pumping circuit for producing a bipolar voltage output at substantially double the unipolar voltage input source.

It is a further object of this invention to provide such an improved charge pumping circuit in which the positive and negative voltage may be generated in any order.

It is a further object of this invention to provide such an improved charge pumping circuit in which the more highly, freshly charged capacitor is used to first generate the negative voltage and thus offset the greater loss experienced in the negative voltage generator circuit to more nearly equalize the voltages.

It is a further object of this invention to provide such an improved charge pumping circuit in which the charging cycle of the transfer capacitor is extended to be compatible with the sum of the two discharge cycles to more nearly equalize the generated voltage.

It is a further object of this invention to provide such an improved charge pumping circuit which is simpler, less expensive, smaller and more reliable.

The invention results from the realization that a truly simple and effective voltage doubling and inverting circuit which provides virtually equal positive and negative outputs can be achieved using only two capacitors by charging one capacitor to the input voltage level and connecting it in series with the source to provide the doubled uninverted output, and using that one capacitor with the source to charge the other capacitor to the inverted doubled source voltage.

This invention features a charge pump circuit for providing a bipolar voltage output that substantially doubles the unipolar voltage input source. There is a voltage input terminal and a reference input terminal, a first and a second capacitor and a first and second voltage output terminal. A first switching means selectively connects the first capacitor across the input terminals to charge the first capacitor to the voltage of the input source. A second switching means selectively connects the first capacitor in series between the voltage input terminal and one of the voltage output terminals to generate a first output voltage of a first polarity which is substantially double the voltage of the input source. Third switching means selectively connects in series between the input terminals the first and second capacitors for providing a second polarity voltage across the second capacitor which is substantially double the source voltage. Fourth switching means selectively connects the second capacitor between the reference input terminal and the other output terminal for generating a second output voltage which is substantially double the voltage of the input source and inverted with respect to the polarity of the first output voltage. Clock means sequentially, selectively, actuate the first switching means, then one of the second and third switching means, and then the other of the second and third switching means and actuates the fourth switching means when the third switching means is not actuated.

In a preferred embodiment, the first switching means may connect the positive electrode of the first capacitor to the voltage input terminal and the negative electrode of the first capacitor to the reference voltage terminal. The second switching means may connect the negative electrode of the first capacitor to the voltage input terminal and the positive electrode of the first capacitor to one of the voltage output terminals. The third switching means may connect the positive electrode of the first capacitor to the reference input terminal and the positive electrode of the second capacitor to the voltage input terminal. The fourth switching means may connect the positive electrode of the second capacitor to the reference input terminal and the negative electrode of the second capacitor to the other voltage output terminals. The clock means may actuate the first switching means and then the second switching means and then the third switching means. The clock means may alternatively actuate the first switching then the third switching means and then the second switching means. The clock may provide a three phase clock signal and each of the phases may be generally equal in duration. Alternatively, the first phase may generally be equal in duration to the sum of the second and third phases. The voltage input terminal may be a positive terminal and the reference input terminal may be a negative terminal. The first voltage output terminal may be a positive terminal and the second voltage output terminal may be a negative terminal.

The invention also features a charge pump circuit for providing a bipolar voltage output that substantially doubles the unipolar voltage input source. There is a positive and a negative input terminal, a first and second capacitor, and a positive and negative output terminal. There are first switching means for selectively connecting the positive electrode of the first capacitor to the positive input terminal and the negative electrode to the negative input terminal to charge the first capacitor to the voltage of the input source. Second switching means selectively connects the negative electrode of the first capacitor to the positive input terminal and the positive electrode of the first capacitor to the positive voltage output terminal for generating a positive output voltage which is substantially double the voltage of the input source. Third switching means selectively connects, between the input terminals, the first and second capacitors in series with the positive electrode of the first capacitor connected to the negative input terminal and the positive electrode of the second capacitor connected to the positive input terminal for providing a second polarity voltage across the second capacitor which substantially double the source voltage. Fourth switching means selectively connects the second capacitor between the negative input terminal and the negative voltage output terminal for generating a negative output voltage which is substantially double the voltage of the input source. Clock means sequentially, selectively actuate the first switching means, then one of the second and third switching means, and then the other of the second and third switching means and actuates the fourth switching means when the third switching means is not actuated.

DISCLOSURE OF PREFERRED EMBODIMENT

Other objects, features and advantages will occur to those skilled in the art from the following description of a preferred embodiment and the accompanying drawings, in which.

A charge pump circuit for providing a bipolar voltage output at substantially double the unipolar voltage input source according to this invention may be accomplished using two transfer capacitors. There are first and second input terminals, typically positive and negative terminals with, for example, the negative terminal grounded; and there are two capacitors. There are also positive and negative voltage output terminals at which are presented the positive doubled voltage and the negative doubled voltage. First switching means selectively connect the first capacitor across the input terminals to charge it to the voltage of the input source in response to the first phase of a three phase clock signal. In response to either the second or the third phase of the clock signal, second switching means selectively connects the first capacitor in series between the positive voltage input terminal and the positive voltage output terminal to generate an output voltage which is positive in polarity and substantially double the voltage of the input source. Third switching means responsive to the other of the second and third clock phases connects, between the input terminals, the first and second capacitors in series with the positive electrode of the first capacitor connected to the negative input terminal and the positive electrode of the second capacitor connected to the positive voltage input terminal for providing a second polarity voltage across the second capacitor which is substantially double the source voltage. Fourth switching means, which are operated at any time other than when the third switching means is active, selectively connects the second capacitor between the negative input terminal and the negative output terminal for generating a second output voltage which is substantially double the voltage of the input source. The circuit may conveniently be implemented with NMOS and PMOS FET switches. The first phase of the clock signal can be enlarged to equal the combined duration of the second and third phase in order to provide a more fully charged capacitor to provide equal charge to both the double positive and double negative output voltages. That same purpose, namely maintaining equality and minimizing ripple between the double positive and double negative output voltages may be served by first applying the charge on the capacitor to generate the negative double output voltage and then applying the charge on the capacitor to generate the doubled positive output voltage: generation of the negative voltage encounters more resistance and thus greater losses. Applying the capacitor charge first to the negative voltage generation circuit offsets the greater losses with the greater charge availability during the first part of the operation and applies the lower charged capacitor, during the second part of the operation, to the positive voltage generating circuit which experiences less losses.

Figure 1:
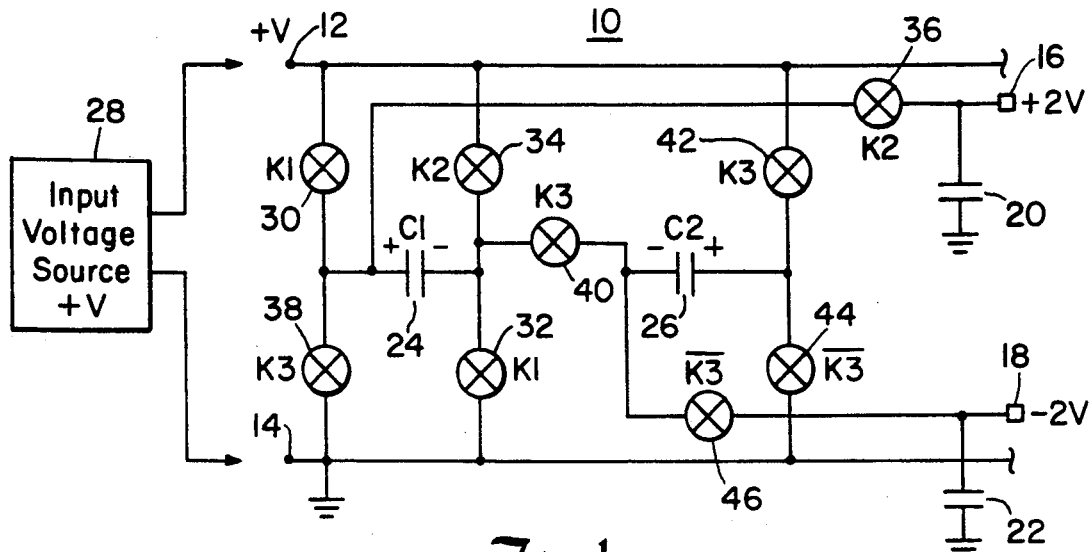
FIG. 1 is a schematic diagram of the charge pump circuit according to this invention.

There is shown in FIG. 1 a charge pump circuit 10 according to this invention having positive 12 and negative 14 input terminals. Negative terminal 14 is grounded. There are also two output terminals, the doubled positive output terminal 16 and the doubled negative or inverted output terminal 18. Conventional reservoir capacitors 20 and 22 are employed at output terminals 16 and 18.

Figure 2:
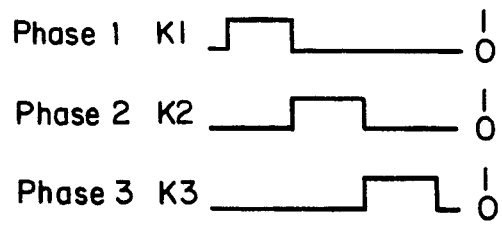
FIG. 2 shows the clock signals which operate the charge pump circuit of FIG. 1.

In accordance with this invention, there are two transfer capacitors 24 and 26. Input voltage +V is provided by the input voltage source 28 to input terminals 12 and 14. Circuit 10 includes K1 switches 30, 32, which are operated during phase one of the three-phase clock signal shown in FIG. 2. There are two K2 switches 34 and 36 operated during the second phase of the clock signal and three K3 switches 38, 40 and 42 which are operated during the third phase of the clock signal.

Two additional $\overline{K3}$ switches 44 and 46 are actuated at times other than phase three, namely during either or both of phase one and phase two.

In operation, during phase one of the clock signal, switches 30 and 32 ar actuated to connect the positive electrode of capacitor 24 to the positive input voltage terminal 12 and the negative electrode of capacitor 24 to the negative input voltage terminal 14 which is at ground. During phase two of the clock signal switches 30 and 32 are disabled and switches 34 and 36 are actuated so that capacitor 24 has its negative electrode connected directly to the positive input voltage terminal 12 and its positive electrode connected to the positive output voltage terminal 16 where it provides the voltage +2V substantially twice the input voltage on terminal 12.

During phase three, switches 34 and 36 are disabled and switches 38, 40, and 42 are actuated. This connects the positive electrode of capacitor 24 to ground and the positive electrode of capacitor 26 to the positive input voltage terminal 12 and interconnects to each other the negative electrodes of capacitors 24 and 26. This causes capacitor 26 to charge to voltage 2V: twice the input voltage. During either one or both of the next clock phases, that is clock phase one or clock phase two, switches 44 and 46 are actuated to connect the positive electrode of capacitor 26 to ground at negative input terminal 14 and the negative electrode of capacitor 26 to the negative output terminal 18 whereby there is provided a voltage of −2V. That is, a voltage which is twice the input voltage of +V, at input terminal 12 and inverted with respect to that input voltage.

Figure 3:
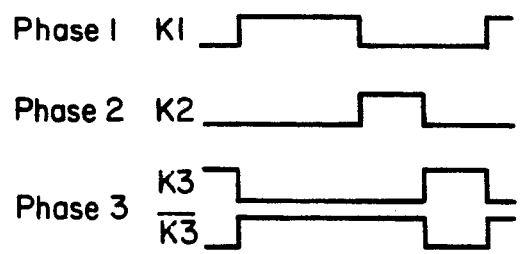
FIG. 3 shows an alternative form of clock signal for the circuit of FIG. 1 with the first phase equal in duration to the source of the second and third phase.

Switches 44 and 46 are indicated as $\overline{K3}$ indicating that they can be actuated at any time other than phase three of the clock. That is, they can be operated during phase one, during phase two, or during both phase one and phase two. Since capacitor 24 is used to generate both the positive doubled output voltage on output terminal 16 and the negative doubled output voltage on negative output terminal 18, the charge stored in it must be made available twice. The second application of the charge in capacitor 24 to generate the negative, that is −2V, voltage across capacitor 26 will be somewhat less in magnitude than the original voltage, and thus there is a potential for the negative output, the inverted doubled output at terminal 18, to be somewhat less than the positive doubled output at output terminal 16. To compensate for this, phase one of the clock signal may be extended as shown in FIG. 3 where the phase one signal that operates the K1 switches, switches 30 and 32, is made to have a duration which is twice that of either of the second and third phase clock signals. Stated differently, the duration of the phase one signal is equal to the sum of the durations of the phase two plus the phase three three signals.

Figure 4:
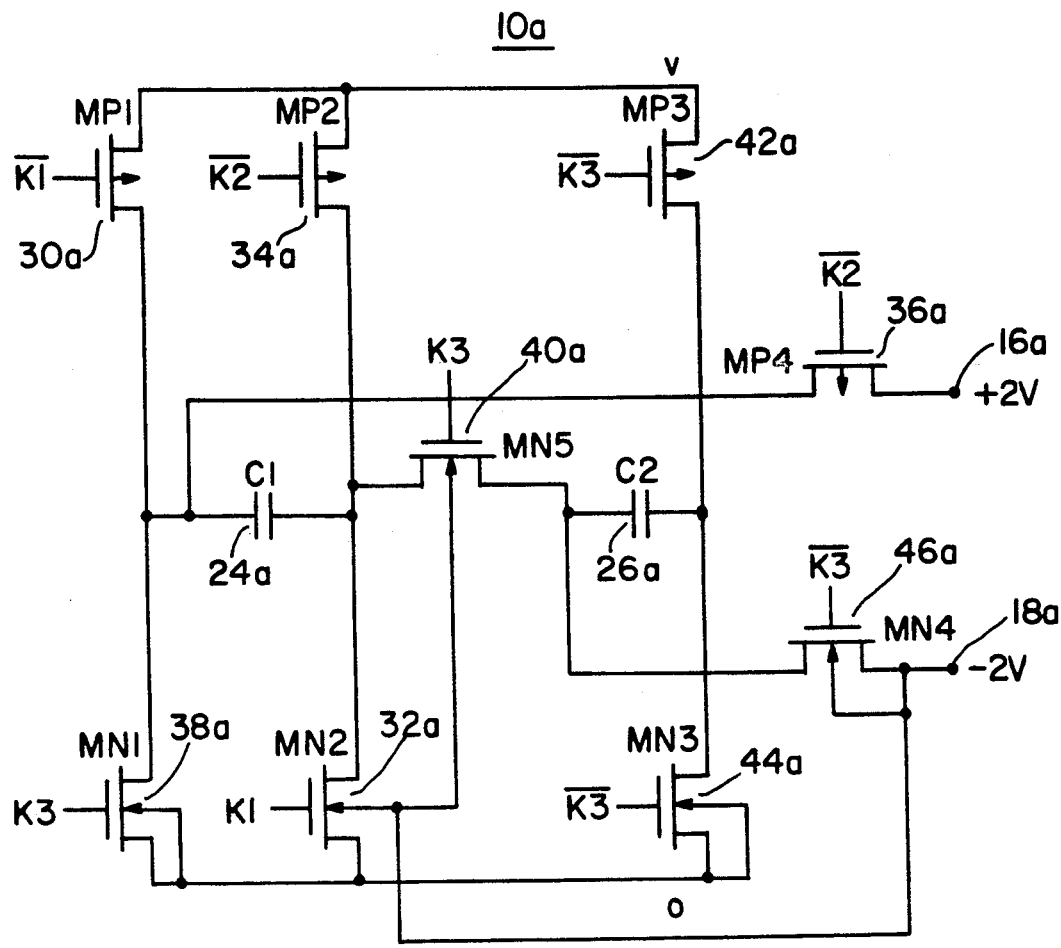
FIG. 4 is a schematic diagram showing a practical implementation of the circuit of FIG. 1 using NMOS and PMOS semiconductor switches.
Figure 5:
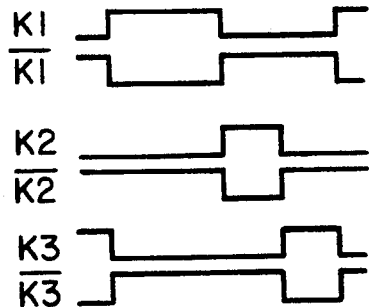
FIG. 5 shows the clock signals used to actuate the semiconductor switches in FIG. 4.

The invention may be implemented using NMOS and PMOS FET semiconductor switches as shown in FIG. 4, where like parts have been given like numbers accompanied by a lower case a. The system operates exactly as explained with respect to FIGS. 1 and 2, with the exception that each of the clock signals K1, K2, and K3 have been provided along with their complements $\overline{K1}$, $\overline{K2}$, $\overline{K3}$ in order to accommodate the different polarity switching voltages, high for NMOS, low for PMOS, that are required by the semiconductor implementation shown in FIG. 4. FETs semiconductor switches 30a, 34a, 42a, and 36a are PMOS FET semiconductors, while FETs 40a, 38a, 32a, and 44a are NMOS FETs.

Figure 6:
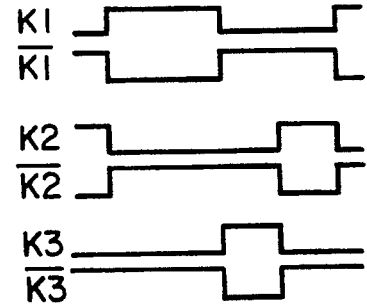
FIG. 6 shows an alternative set of clock signals used to actuate the semiconductor switches in FIG. 4.

Although thus far the timing of the circuit has shown that the clock signal is arranged with phase two following phase one, and phase three following phase two, this is not a necessary limitation of the invention. For example, as shown in FIG. 6 phase three can immediately follow in time phase one and then phase two can follow phase three. This is a preferred implementation in some applications because this uses capacitor 24a to first provide the negative or inverted doubled voltage output and then to provide the positive doubled voltage output. This is done because generally there are more switches used in the circuit which generates the doubled negative voltage than are used in the circuits which generate the doubled positive voltage. The additional switch or switches increases the resistance in the negative voltage generating circuit so that there is a greater loss of voltage during the negative voltage generation. Since it is separately understood that the capacitor has the most charge available for the first voltage generated, and a lesser charge available for the for second voltage generated the notion is to apply the charge in capacitor 24a first to generate the negative doubled voltage which experiences the greater loss in the negative voltage generation circuit and then apply the somewhat depleted charge in capacitor 24a to generate the positive doubled output voltage which suffers less loss in its generation in the positive voltage generation circuit thereby offsetting the two loss sources against one another so that the doubled positive and negative voltages are more nearly equal as provided at the output.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A charge pump circuit for providing a bipolar voltage output that substantially doubles the unipolar voltage input source, comprising:

a voltage input terminal and a reference input terminal;

a first and second capacitor;

first and second voltage output terminals;

first switching means for selectively connecting said first capacitor across said input terminals to charge said first capacitor to the voltage of the input source;

second switching means for selectively connecting said first capacitor in series between said voltage input terminal and one of said voltage output terminals to generate a first output voltage of a first polarity which is substantially double the voltage of the input source;

third switching means for selectively connecting in series between said input terminals said first and second capacitors for providing a second polarity voltage across said second capacitor which is substantially double the source voltage;

fourth switching means for selectively connecting said second capacitor between said reference input terminal and the other of said output terminals for generating a second output voltage which is substantially double the voltage of the input source and inverted with respect to the polarity of the first output voltage; and clock means for sequentially selectively actuating said first switching means, then one of said second and third switching means, and then the other of said second and third switching means and for actuating said fourth switching means when said third switching means is not actuated.

2. The charge pump circuit of claim 1 in which said first switching means connects the positive electrode of said first capacitor to said voltage input terminal and the negative electrode of said first capacitor to the reference voltage terminal.

3. The charge pump circuit of claim 1 in which said second switching means connects the negative electrode of said first capacitor to said voltage input terminal and the positive electrode of said first capacitor to said one of said voltage output terminals.

4. The charge pump circuit of claim 1 in which said third switching means connects the positive electrode of said first capacitor to said reference input terminal and the positive electrode of the second capacitor to the voltage input terminal.

5. The charge pump circuit of claim 1 in which said fourth switching means connects the positive electrode of said second capacitor to said reference input terminal and the negative electrode of said second capacitor to said other of said voltage output terminals.

6. The charge pump circuit of claim 1 in which said clock means actuates said first switching means then said second switching means and then said third switching means.

7. The charge pump circuit of claim 1 in which said clock means actuates said first switching means then said third switching means and then said second switching means.

8. The charge pump circuit of claim 1 in which said clock provides a three phase clock signal.

9. The charge pump circuit of claim 8 in which each of said phases are generally equal in duration.

10. The charge pump circuit of claim 8 in which said first phase is generally equal in duration to the sum of the second and third.

11. The charge pump circuit of claim 1 in which said voltage input terminal is a positive terminal, said reference input terminal is a negative terminal, said first voltage output terminal is a positive terminal and said second voltage output terminal is a negative terminal.

12. A charge pump circuit for providing a bipolar voltage output that substantially doubles the unipolar voltage input source, comprising:
a positive and a negative input terminal;
a first and second capacitor;
a positive and a negative voltage output terminal;
first switching means for selectively connecting the positive electrode of said first capacitor to said positive input terminal and the negative electrode to said negative input terminal to charge said first capacitor to the voltage of the input source;
second switching means for selectively connecting the negative electrode of said first capacitor to said positive input terminal and the positive electrode of said first capacitor to said positive voltage output terminal for generating a positive output voltage which is substantially double the voltage of the input source;
third switching means for selectively connecting between said input terminals said first and second capacitors in series with the positive electrode of said first capacitor connected to said negative input terminal and the positive electrode of the second capacitor connected to the positive input terminal for providing a second polarity voltage across said second capacitor which is substantially double the source voltage;
fourth switching means for selectively connecting said second capacitor between said negative input terminal and said negative voltage output terminal for generating a negative output voltage which is substantially double the voltage of the input source; and
clock means for sequentially selectively actuating said first switching means, then one of said second and third switching means, and then the other of said second and third switching means and for actuating said fourth switching means when said third switching means is not actuated.

13. A charge pump circuit for providing a bipolar voltage output that substantially doubles the unipolar voltage input source, comprising:
a positive and a negative input terminal;
a first and second capacitor;
a positive and a negative voltage output terminal;
clock means for providing a three phase clock signal;
first switching means, responsive to the first phase of said clock signal, for selectively connecting the positive electrode of said first capacitor to said positive input terminal and the negative electrode to said negative input terminal to charge said first capacitor to the voltage of the input source;
second switching means, responsive to one of said second and third phases of said clock signal, for selectively connecting the negative electrode of said first capacitor to said positive input terminal and the positive electrode of said first capacitor to said positive voltage output terminal for generating a positive output voltage which is substantially double the voltage of the input source;
third switching means, responsive to the other of said second and third phases of said clock signal for selectively connecting between said input terminals said first and second capacitors in series with the positive electrode of said first capacitor connected to said negative input terminal and the positive electrode of the second capacitor connected to the positive input terminal for providing a second polarity voltage across said second capacitor which is substantially double the source voltage;
fourth switching means, responsive to one or both of said first and second phases of said clock signal, when said third switching means is not actuated, for selectively connecting said second capacitor between said negative input terminal and said negative voltage output terminal for generating a negative output voltage which is substantially double the voltage of the input source; and
clock means for sequentially selectively actuating said first switching means, then one of said second and third switching means, and then the other of said second and third switching means and for actuating said fourth switching means when said third switching means is not actuated.

* * * * *

UNITED STATES PATENT AND TRADEMARK OFFICE
CERTIFICATE OF CORRECTION

PATENT NO. : 5,262,934
DATED : November 16, 1993
INVENTOR(S) : Colin C. Price

It is certified that error appears in the above-indentified patent and that said Letters Patent is hereby corrected as shown below:

On the title page, Item [73] Assignee: should read --Analog Devices, Inc., Norwood, Massachusetts--.

Signed and Sealed this

Ninth Day of August, 1994

Attest:

BRUCE LEHMAN

Attesting Officer

Commissioner of Patents and Trademarks